(12) United States Patent
Bell et al.

(10) Patent No.: US 7,940,172 B2
(45) Date of Patent: May 10, 2011

(54) COMBINING TIME AND GPS LOCATIONS TO TRIGGER MESSAGE ALERTS

(75) Inventors: David Bell, Southampton (GB); Philip Norton, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/328,617

(22) Filed: Dec. 4, 2008

(65) Prior Publication Data

US 2010/0141514 A1    Jun. 10, 2010

(51) Int. Cl.
*G08B 1/08*    (2006.01)

(52) U.S. Cl. ............... 340/539.13; 340/995.1; 340/994; 701/200; 701/204

(58) Field of Classification Search ............ 340/539.13, 340/995.1, 995.17, 988, 990, 994; 342/357.22, 342/357.39; 701/2, 300, 200, 201, 204, 213
See application file for complete search history.

(56) References Cited

U.S. PATENT DOCUMENTS

| | | | |
|---|---|---|---|
| 5,541,845 A | 7/1996 | Klein | |
| 5,917,434 A * | 6/1999 | Murphy | ........................ 340/991 |
| 6,385,465 B1 | 5/2002 | Yoshioka | |
| 6,411,891 B1 | 6/2002 | Jones | |
| 6,509,830 B1 * | 1/2003 | Elliott | ..................... 340/286.02 |
| 6,850,839 B1 | 2/2005 | McGibney | |
| 6,980,131 B1 * | 12/2005 | Taylor | ........................... 340/994 |
| 2009/0031006 A1 * | 1/2009 | Johnson | ........................ 709/218 |

* cited by examiner

*Primary Examiner* — Toan N Pham
(74) *Attorney, Agent, or Firm* — Dillon & Yudell LLP

(57) ABSTRACT

A method, system and computer program product for automatically alerting one or more recipients of the arrival of an individual to a known destination via a global positioning system (GPS) navigation device. To issue an accurate alert of arrival time and or distance, the device enables: (1) pre-selection of two or more locations from a plurality of mapped locations; (2) pre-selection of one or more devices to which an alert is to be sent when the GPS device passes through the pre-selected locations; and (3) pre-selection of a time during which the alert should be triggered. The device automatically sends an alert to one or more devices when the GPS device passes through the pre-selected locations during the pre-selected time period, wherein the alert informs the user of the one or more recipient devices that the individual (corresponding to the GPS device) has commenced a journey to the destination.

1 Claim, 6 Drawing Sheets

COMBINING TIME AND GPS LOCATIONS TO TRIGGER MESSAGE ALERTS

BACKGROUND

1. Technical Field

The present invention generally relates to computer systems and in particular to navigational software applications in computer memory systems.

2. Description of the Related Art

Navigation software applications are routinely utilized to obtain instructions to and from a user-defined destination. More recently, navigation software applications have been utilized to track the location of devices. Navigation devices of all kinds have been in use for pinpointing objects, people and animals on the surface of the earth, under water, or in space. Some wireless devices also provide navigational information such as whether or not a device or vehicle is "on course" to its predetermined destination.

Current methods for tracking whether a device or vehicle is on course to its predetermined destination do not facilitate many individual's needs. One existing tracking systems references the motion of a device relative to time only permitting the device to alert a recipient of the devices location at regular intervals. Issuing a message regarding location of a device at time intervals alone results in a constant stream of alerts, and with no guarantee that the vehicle is heading to a specific destination.

Another device alerts recipients of when a device is approaching a destination; however the assessment of when the device approaches the destination is based on distance from the destination. Thereby solely sending an alert when the device is within the set distance of a destination. The problem with this method of reporting when a device is on course to reach a destination is, when the device approaches the distance of reference at any time within a day, an alert would be transmitted reporting the device is near the destination. Reporting destination arrival time solely based on device distance from the destination may be confusing if the individual with the device is in the vicinity of the distance through the day. False alerts may be a distraction and cause unnecessary preparation, thereby wasting time and resources.

SUMMARY OF ILLUSTRATIVE EMBODIMENTS

Disclosed are a method, system and computer program product for automatically alerting one or more recipients of the arrival of an individual to a known destination via a global positioning system (GPS) navigation device. To issue an accurate alert of arrival time and or distance, the device enables: (1) pre-selection of two or more locations from a plurality of mapped locations; (2) pre-selection of one or more devices to which an alert is to be sent when the GPS device passes through the pre-selected locations; and (3) pre-selection of a time during which the alert should be triggered. The method for transmitting the alert is also pre-selected from one or more of: sending a text message and voice alert. The locations are selected as a requirement for transmitting the alert, are selected in a pre-selected order to identify a start of a journey to a destination. The device automatically sends the alert to one or more devices when the GPS device passes through the pre-selected locations during the pre-selected time period, wherein the alert informs the user of the one or more recipient devices that the individual (corresponding to the GPS device) has commenced a journey to the destination.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for automatically alerting one or more recipients of the arrival of an individual to a known destination via a global positioning system (GPS) navigation device. To issue an accurate alert of arrival time and or distance, the device enables: (1) pre-selection of two or more locations from a plurality of mapped locations; (2) pre-selection of one or more devices to which an alert is to be sent when the GPS device passes through the pre-selected locations; and (3) pre-selection of a time during which the alert should be triggered. The method for transmitting the alert is also pre-selected from one or more of: sending a text message and voice alert. The locations are selected as a requirement for transmitting the alert, are selected in a pre-selected order to identify a start of a journey to a destination. The device automatically sends the alert to one or more devices when the GPS device passes through the pre-selected locations during the pre-selected time period, wherein the alert informs the user of the one or more recipient devices that the individual (corresponding to the GPS device) has commenced a journey to the destination.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
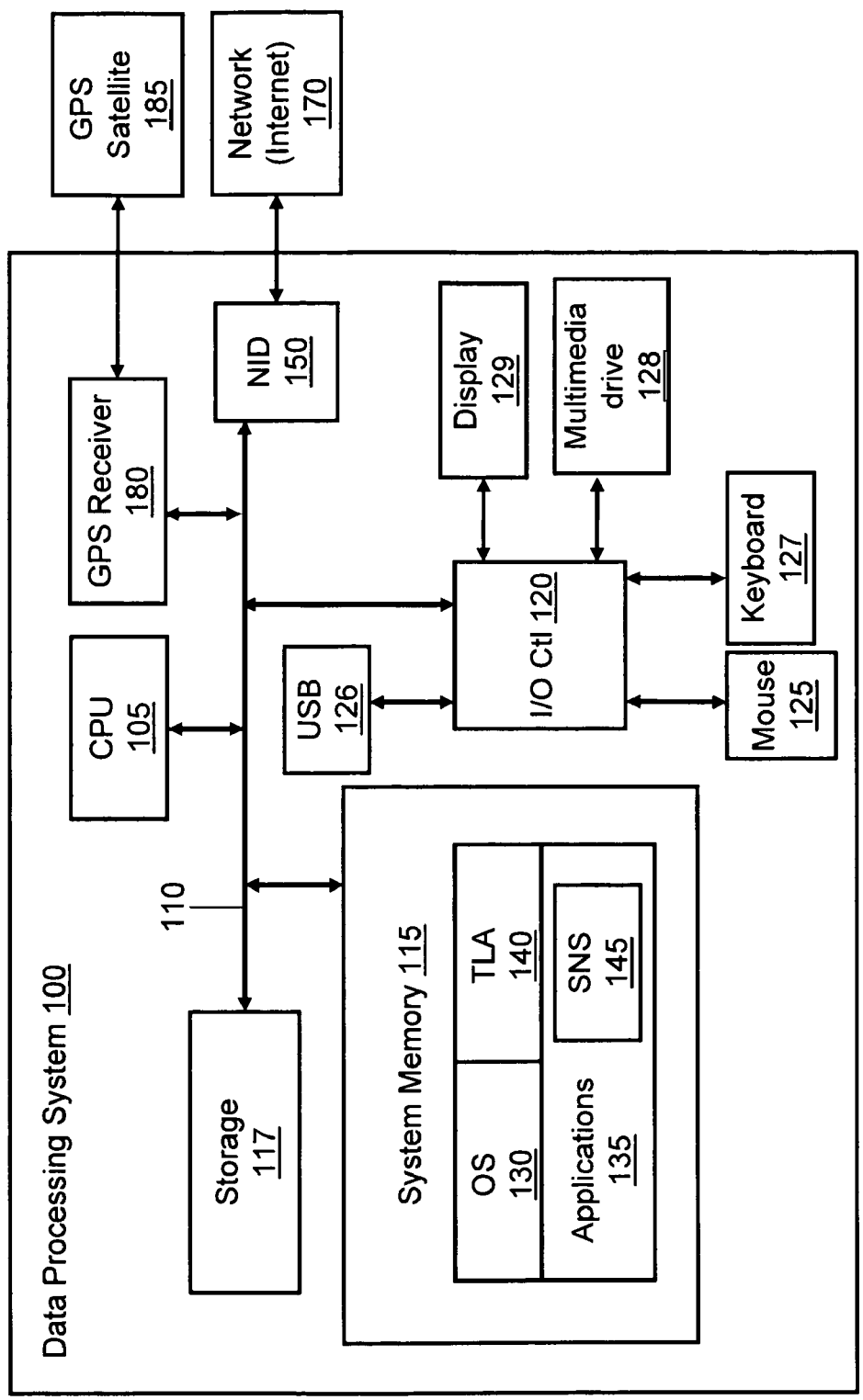
FIG. 1 is a block diagram of a data processing system, within which various features of the invention may advantageously be implemented, according to one embodiment of the invention.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 129 are illustrated, coupled to I/O controller. DPS 100 also comprises storage 117, within which data/instructions/code may be stored.

Global positioning receiver 180 is connected to system bus 110 and communicates with global positioning system (GPS) satellite 185. DPS 100 is also illustrated with a network interface device (NID) 150, with which DPS 100 connects to an access network, such as the Internet 150. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135 and time location alert (TLA) utility 140. Applications 135 may include satellite navigation software (SNS) 145, as well as a method for texting, such as utilizing the short message service (SMS). Applications 135 may also support the utilization of digital maps for pre-selecting mapped locations. In actual implementation, applications 135 and TLA utility 140 may be combined as a single application collectively providing the various functions of each individual software component when the corresponding code is executed by CPU 105. For simplicity, TLA utility 140 is illustrated and described as a stand alone or separate software/firmware component, which provides specific functions, as described below.

CPU 105 executes TLA utility 140 as well as OS 130, which supports the user interface features of TLA utility 140. In the illustrative embodiment, TLA utility 140 provides a graphical user interface (GUI) to enable user interaction with, or manipulation of, the functional features of the utility (140). Among the software code/instructions provided by TLA utility 140, and which are specific to the invention, are: (a) code for pre-selecting two or more pre-selected locations from a plurality of mapped locations; (b) code for pre-selecting one or more second devices to which an alert is to be sent when the GPS device passes through the pre-selected locations; and (c) code for pre-selecting a time window during which the alert should be triggered. For simplicity of the description, the collective body of code that enables these various features is referred to herein as TLA utility 145. According to the illustrative embodiment, when CPU 105 executes TLA utility 140, DPS 100 initiates a series of functional processes that enable the above functional features as well as additional features/functionality, which are described below within the description of FIGS. 2-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may comprise some or more of the basic components described above. In one embodiment, portable data processing systems are utilized during route planning for the destination alert, as will be described below. These portable systems may include palmtops, laptops, personal digital assistants (PDAs), and cellular phones.

Figure 2:
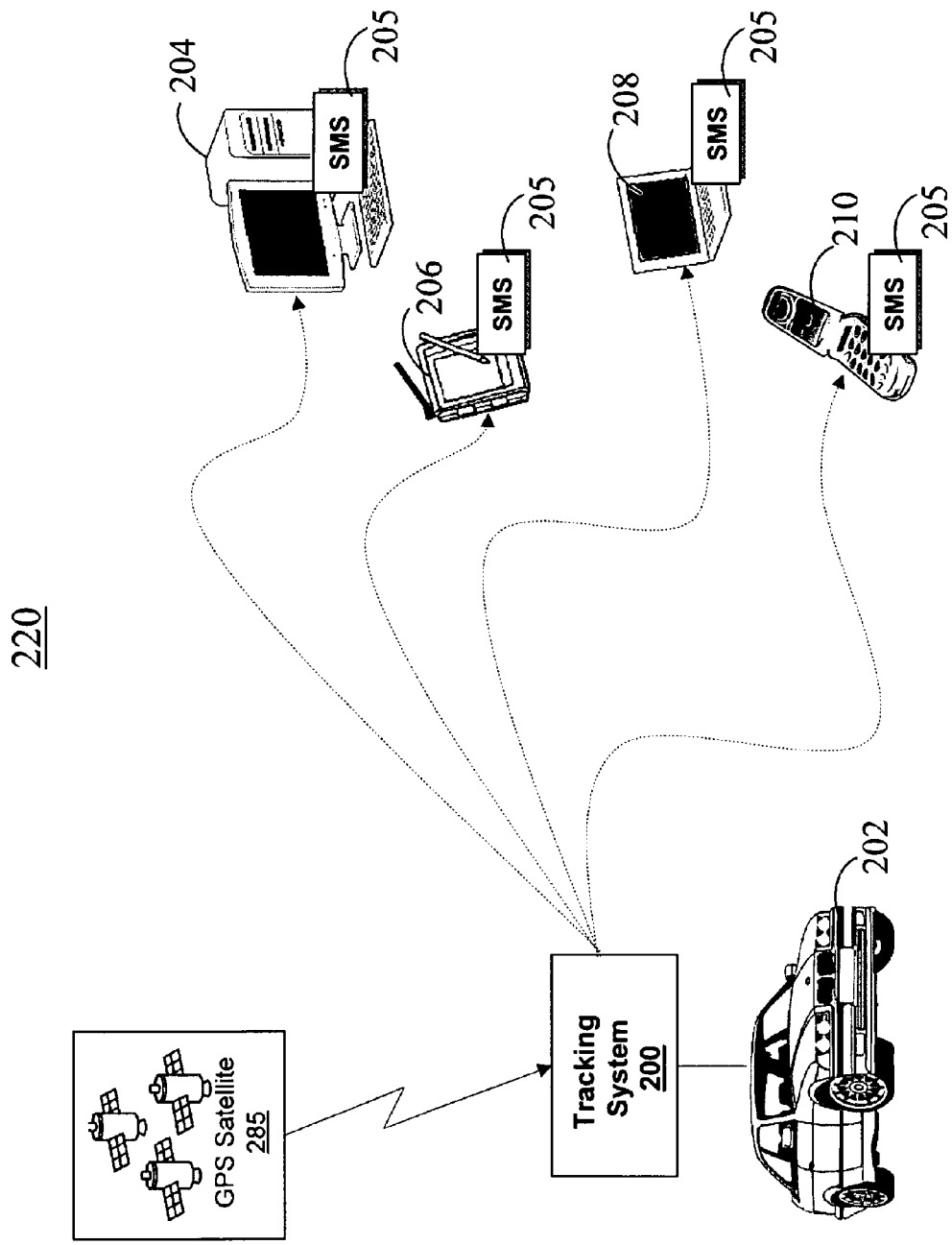
FIG. 2 is a diagram illustrating the utilization of a vehicle navigation system in accordance with one embodiment of the invention.

With reference now to FIG. 2, which illustrates an in-vehicle navigation system, or tracking system, that sends an "in route" alert to one or more devices. Network 220 comprises a tracking system 200. Tracking system 200 may be a stationary or portable device within the confines of vehicle 202. Tracking system 200 receives signals from GPS satellite 285. Tracking system 200 comprises a global positioning system (GPS) device, time keeping system, and message sending system. Tracking system 200 may request to send a message to one or more of the following recipient devices: computer 204, PDA 206, laptop 208, and cellular phone 210. Each recipient device illustrated in network 220 posses the ability to receive text messages via SMS 205.

In one embodiment, tracking system 200 is traveling within vehicle 202. Tracking system 200, similar to DPS 100 of FIG. 1, receives signals that are transmitted by GPS satellite 285. The signals provide positional signals enabling tracking system 200 to determine the current location, speed, direction, and time of vehicle 202, via GPS receiver 180 (FIG. 1). During a specified time frame, when tracking system 200 passes through two specified locations, tracking system 200 permits a message to be automatically sent to one or more of recipient devices: computer 204, PDA 206, laptop 208, and cellular phone 210.

In one embodiment recipient devices (e.g., computer 204, PDA 206, laptop 208, and cellular phone 210) may receive an automatic text message and/or voice message when tracking system 200 is in route to a destination. Each recipient device in network 220 is provided SMS 205. The GPS receiver within tracking system 200 detects when tracking system 200 passes through two or more pre-selected locations in a pre-established order during a pre-selected time window. The locations are pre-selected in a pre-established order to identify a start of a journey to a destination. When the tracking system 200 passes through the pre-selected locations, an automated text message is sent (when SMS 205 is available in the recipient device) and/or a voice message (when voice messages may be received). Text messages are sent utilizing SMS and/or electronic mail (e-mail).

In one embodiment, configuration of tracking system 200 includes enabling the GPS device, the time keeping system, and the message sending system. The time keeping system is established to operate independent of the tracking system; whereby when the time keeping system enters the pre-defined time window, the tracking system is enabled. When the GPS device passes through the pre-selected locations, in the pre-established order, during the pre-selected time window, the message system is enabled. However, the tracking system is configured to only send an automatic message (automated or otherwise) when the GPS device receives a signal from one or more satellites that the GPS device has passed the two pre-selected locations in the pre-established order. The automated notification/alert is then sent by the message sending system.

In one embodiment, configuration of tracking system 200 includes disabling the GPS device, the time keeping system, and the message sending system. Tracking system 200 is disabled when the time keeping system exits the pre-defined time window. If the current time is not within the pre-defined time window, for sending the automated message, the tracking system is disabled; thereby saving power and preventing unnecessary satellite inquiries. When the tracking system is operating in the pre-defined time window, the message system of the tracking system may be disabled when the GPS device has not passed through the pre-selected locations, in the pre-established order. If the message system is disabled when the conditions for sending the message are not attained, inadvertent messages may not be sent to pre-selected devices.

Figure 3:
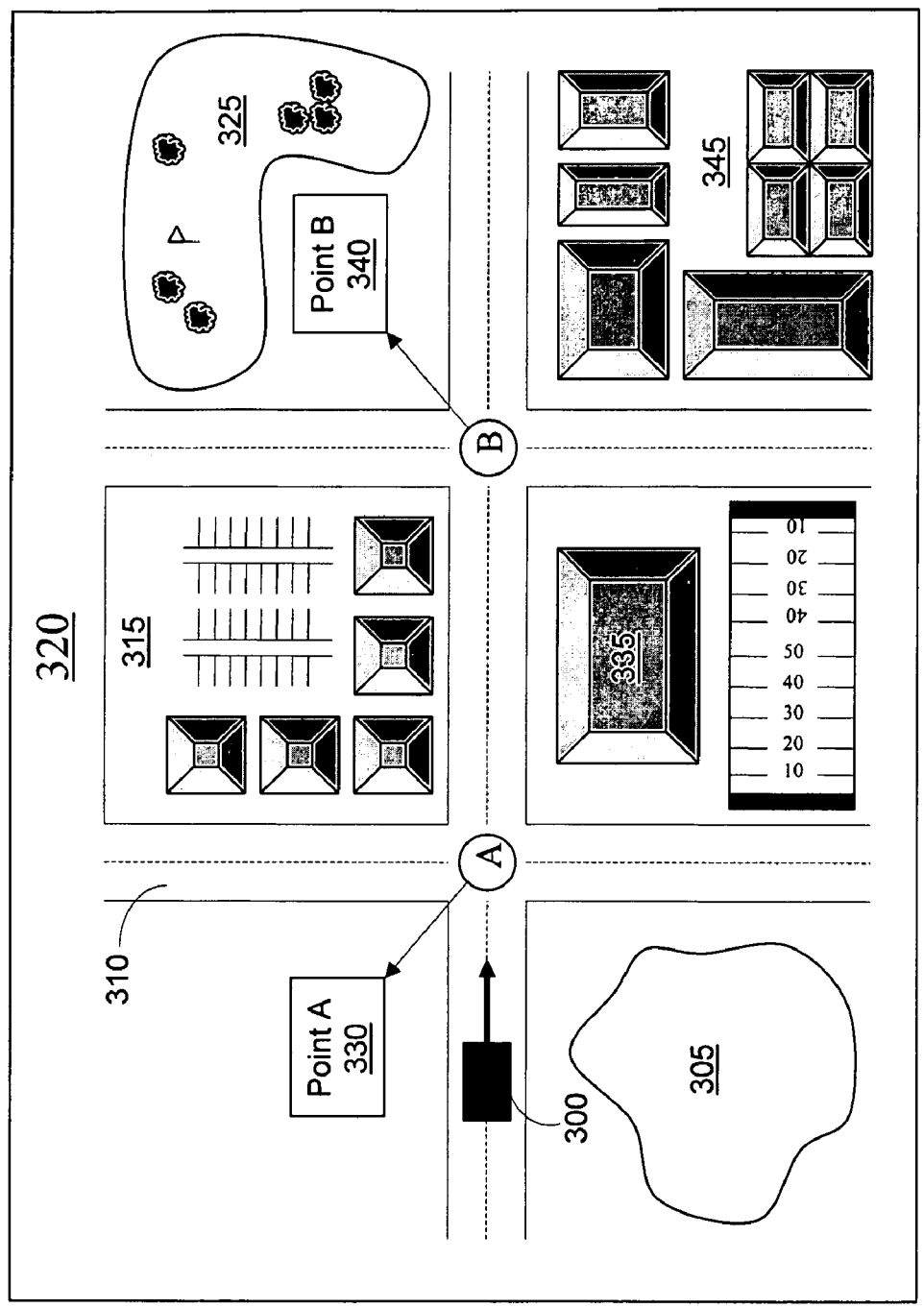
FIG. 3 illustrates pre-selection of two or more locations from a plurality of mapped locations, according to one embodiment of the invention.

FIG. 3 illustrates a plurality of mapped locations for pre-selecting two locations of reference. Map layout 320 of FIG. 3 comprises navigation device 300 on transportation route 310. Point A 330 and point B 340 are pre-selected locations within map layout 320. Map layout 320 comprises a plurality of mapped locations such as: lake 305, shopping center 315, public building 335, recreation site 325, and business park 345. Each mapped location may be utilized as one of one or more reference points when pre-selecting reference locations when sending the automated alert.

In one embodiment pre-selection one or more characteristics required to provide an alert of a movement towards a destination is enabled on navigation device 300. Two or more locations are pre-selected from a plurality of mapped locations. Point A 330 is chosen as the first pre-selected location. Point B 340 is chosen as the second pre-selected location. Point A 330 and point B 340 are intersections within map layout 320. When navigation device passes through point A 330 and point B 340, during the specified time period, an alert is sent to pre-selected recipients of the arrival time and/or distance of the individual in possession of navigation device 300.

In one embodiment, any two or more map locations may be selected as reference points for alerting a recipient of an estimated arrival time. The plurality of mapped locations may be natural and or manmade locations that are available for selection from a navigation device such as: lake 305, shopping center 315, public building 335, recreation site 325, and business park 345. The setup may comprise multiple points of reference wherein the alert is not transmitted to the pre-selected recipient until each point is passed in the predetermined order, and in the pre-selected time period. Therefore when stops are made in between the pre-selected points, the alert message is not affected when in the pre-selected time period.

Figure 4:
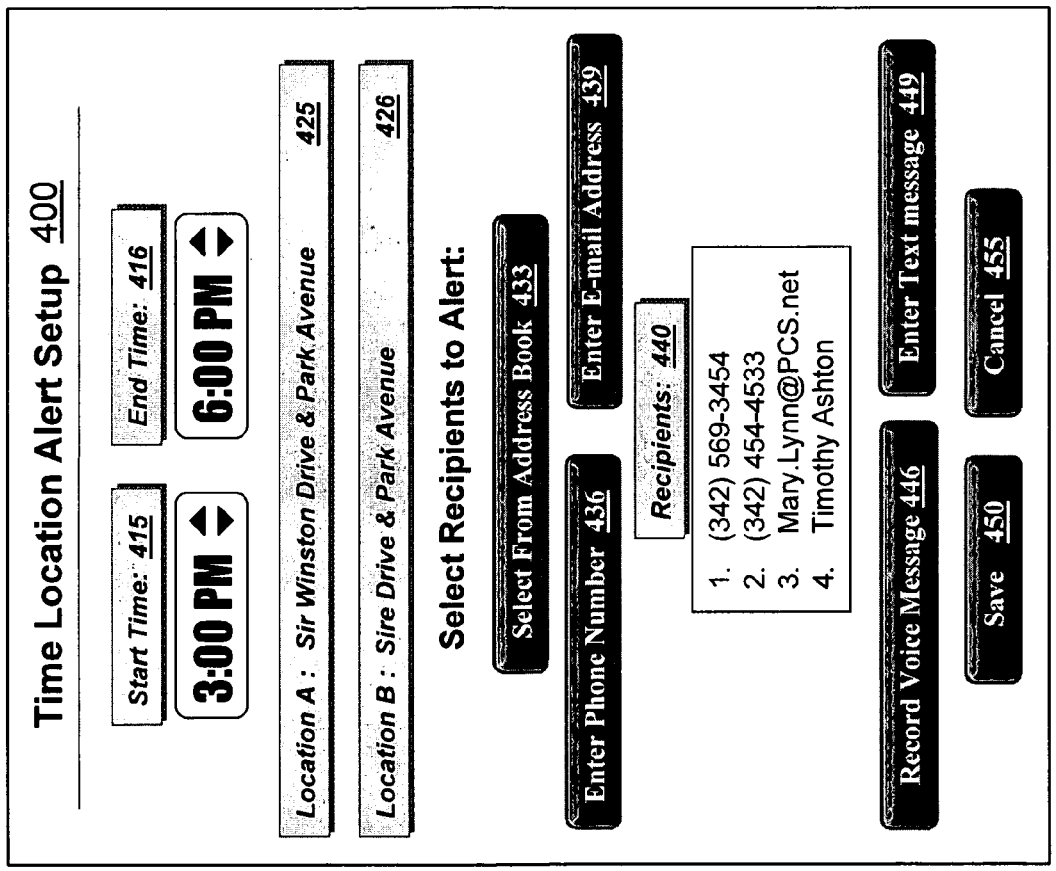
FIG. 4 illustrates a graphical user interface for enabling the entry of preferences in accordance with one embodiment of the invention.

The GUI of FIG. 4 illustrates the time location alert (TLA) setup GUI. TLA setup GUI 400 comprises start time input 415, end time input 416, location A entry 425, and location B entry 426. Recipient entry 440 may be entered by selecting: address book selection 433, phone number selection 436, and e-mail address selection 439. A voice message is recorded for automated sending by choosing voice record selection 446, and a text message may be sent by choosing text message selection 449. Save 450 stores the each alert setup and cancel 455 exits TLA GUI 400 without storing the alert setup.

In one embodiment, TLA GUI 400 is utilized to pre-select a time during which an alert should be triggered when a first device, or the navigation device enters two or more locations from a plurality of mapped locations. Start time input 415 and end time input 416 receive the interval in which to send an alert when the navigation device detects passing the two or more pre-selected locations of location A 425 and location B 426.

In one embodiment, TLA GUI 400 also enables pre-selection of one or more second devices to which an alert is to be sent when the GPS device passes through the pre-selected locations. Recipient entry 440 may be chosen via: address book selection 433, phone number selection 436, and e-mail address selection 439. The pre-selected method of message transmission may be configured to automatically adjust to the method selected to contact the recipient by dynamically selecting the method for transmitting the alert from the first device to the one or more second devices. One or more of a voice message alert and text message alert are automatically sent when a phone number is entered in recipient entry 440. When an electronic mail (e-mail) address is one of the identification method of the second device in recipient entry 440, the device automatically sends a text message alert to the e-mail address.

In one embodiment, a method is pre-selected for transmitting the alert from the first device to the one or more second devices. Voice record selection 446 is selected to record a voice message for automatically sending the voice message to one or more recipients entered in recipient entry 440. Text message selection 449 may be chosen to deliver a text message to one or more recipients in recipient entry 440. One or more of a text message and a voice message is automatically sent, as selected by the individual setting the preferences within TLA setup GUI 400. Save 450 stores the setup preferences. Voice message selection 446 and text message selection 449 may also provide an automated voice message and/or an automated text message.

Figure 5:
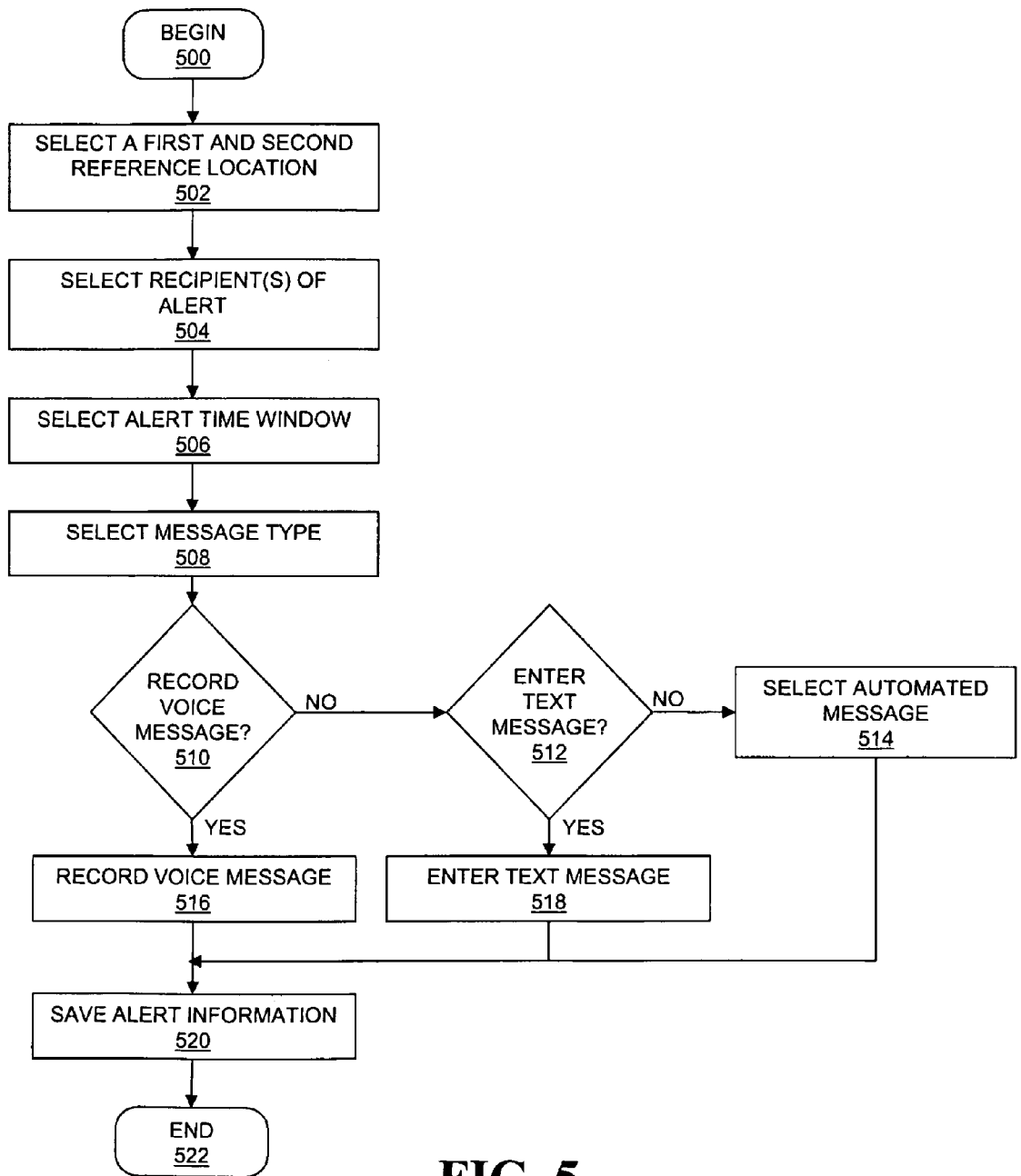
FIG. 5 is a logic flow chart for pre-selecting preferences according to one embodiment of the invention.
Figure 6:
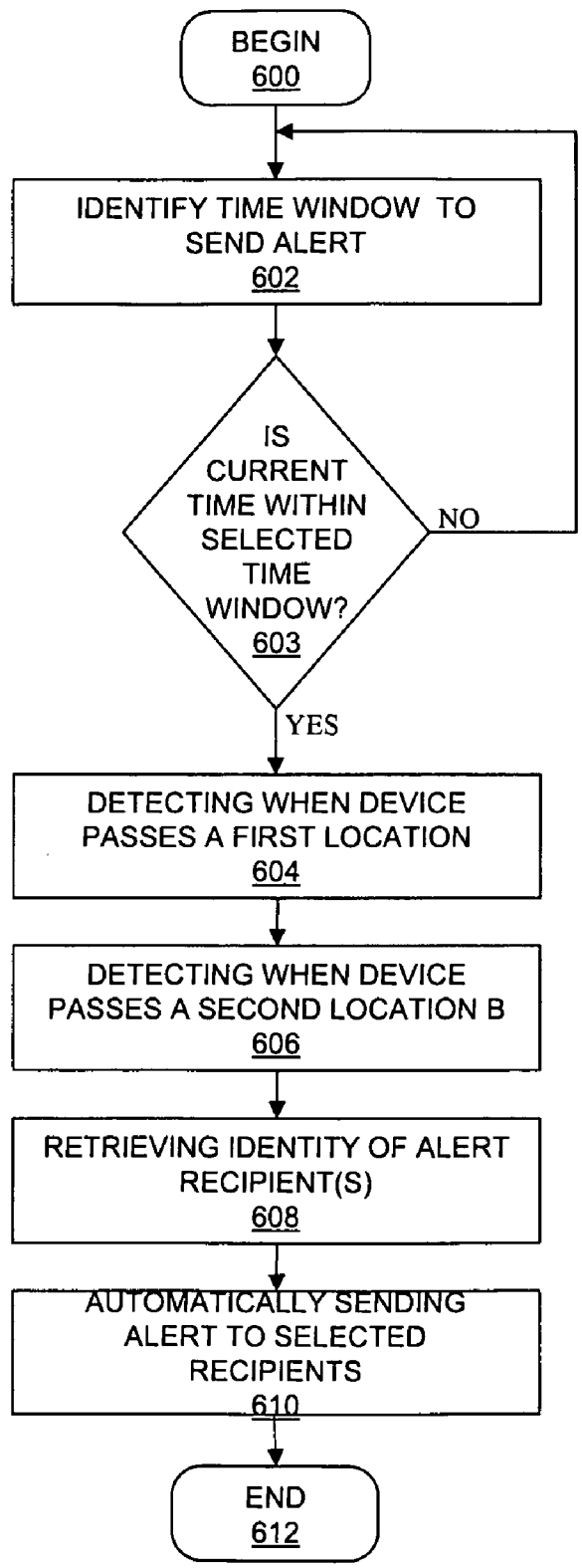
FIG. 6 is a logic flow chart for automatically sending an alert to recipients from the navigation device in accordance with one embodiment of the invention.

FIGS. 5-6 are flow charts illustrating various methods by which the above processes of the illustrative embodiments are completed. Although the methods illustrated in FIGS. 5-6 may be described with reference to components shown in FIGS. 1-4, it should be understood that this is merely for convenience and alternative components and/or configurations thereof can be employed when implementing the various methods. Key portions of the methods may be completed by TLA utility 140 executing within DPS 100 (FIG. 1) and controlling specific operations on DPS 100, and the methods are thus described from the perspective of either/both TLA utility 140 and DPS 100.

The process of enabling pre-selection at a first device of one or more characteristics required to provide an alert of a movement towards a destination is described in the flow chart of FIG. 5. The process of FIG. 5 begins at initiator block 500 and proceeds to block 502, at which a first and a second reference location is selected from a plurality of mapped locations. At block 504 one or more recipients are selected to receive an alert when the navigation device is in route to the destination. A start time and end time are selected, at block 506. The input time window defines when the alert may be sent to the one or more recipients. A message type is selected at block 508.

As a further enhancement of the above process, the method may provide: enabling pre-selection at a first device of one or more characteristics required to provide an alert of a movement towards a destination, wherein said enabling pre-selection includes: receiving a first selection of two or more pre-selected locations from a plurality of mapped locations;

receiving a second selection of a sequential order in which the two or more pre-selected locations are to be passed during movement of a global positioning system (GPS) device, which sequential order indicates movement towards the destination; receiving a third selection of one or more device identification (IDs) one or more second devices to which an alert is to be sent when the GPS device passes through the two or more pre-selected locations in the sequential order; receiving a fourth selection of one or more time windows during which the alert should be triggered; and receiving a fifth selection of one or more alert mechanisms, including a method for transmitting the alert from the first device to the one or more second devices during a specific time window and a preference order for selecting the method from among multiple methods, based on the specific time window in which the alert is transmitted.

The method may further provide for: configuring a tracking system that includes the GPS device, a time keeping system, and a message sending system, wherein configuration of the tracking system includes: operating the time keeping system independently of the tracking system; enabling the tracking system when the time keeping system indicates that a current time is within one of the one or more time windows; disabling the tracking system when the time keeping system indicates that the current time is not within one of the one or more time windows; enabling the message sending system when the GPS device receives a signal from one or more satellites that the GPS device has passed the two or more pre-selected locations, in the pre-established sequential order, during one of the one or more time windows corresponding to the two or more preselected locations; and when the GPS device has not passed through the two or more pre-selected locations, in the pre-established order, during the pre-selected time window, or following a transmission of the alert, disabling the message sending system.

A decision is made at block 510 whether to record a voice message. If a voice message is selected to be recorded, the process continues to block 516. If the voice message is not selected to be recorded the process continues to block 512. The voice message is recorded at block 516. The process continues to block 520. At block 512 a decision is made whether to enter a text message. If a text message is selected to be entered the processes continues to block 518. If a text message is not selected to be entered the process continues to block 514. A text message is entered at block 518. The process continues to block 520. At block 514 an automated message is selected to be sent, the process continues to block 520. At block 520 the preferred alert information is saved. The process ends at block 522.

The process for automatically sending the alert to one or more devices when the GPS device passes through the pre-selected locations is described in the flow chart of FIG. 6. The process begins at block 600 and continues to block 602. At block 602 the time window to send the alert is identified. A decision is made at block 603 whether the current time is within the time window selected for alerting the recipients. If the current time is not within the time window, the process returns to block 602. If the current time is within the time window, the process continues to block 604. The device is detected passing a first location at block 604. At block 606 the device is detected passing a second location. The identifier of the one or more recipients who will receive the alert is retrieved at block 608. An alert is automatically sent to selected recipients at block 610. The process ends at lock 612.

As a further enhancement the above process, the method further provides: detecting, via the GPS device when the GPS device passes through two or more pre-selected locations in a pre-established sequential order during a pre-selected time window, wherein the locations are pre-selected in the pre-established sequential order to identify initiation of a movement towards the destination; retrieving an identification of at least one second device to which the alert is to be sent when the GPS device passes through the pre-selected locations during the pre-selected time window; dynamically selecting the alert mechanism and the method for transmitting the alert from the first device to the one or more second devices, based on the pre-selected time window and the preference order; and automatically sending the alert to the one or more second devices when the GPS device passes through at least two pre-selected locations, in the pre-established order, during the pre-selected time window, wherein the alert informs a user of the one or more second devices that a next user corresponding to the GPS device has commenced a journey to the destination. The dynamically selecting the alert mechanism includes tailoring an alert type based on a selected second device to which the alert is being transmitted. When a phone number is the device ID for the second device, automatically selecting and sending one or more of a voice message alert and text message alert during the pre-selected time window; Also, when an electronic mail (e-mail) address is the device ID of the second device, automatically selecting and sending one or more of an email notification and a text message alert to the e-mail address during the pre-selected time window.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    enabling pre-selection at a first device of one or more characteristics required to provide an alert of a movement towards a destination, wherein said enabling pre-selection includes:
        receiving a first selection of two or more pre-selected locations from a plurality of mapped locations;
        receiving a second selection of a sequential order in which the two or more pre-selected locations are to be passed during movement of a global positioning system (GPS) device, which sequential order indicates movement towards the destination;
        receiving a third selection of one or more device identification (IDs) one or more second devices to which an alert is to be sent when the GPS device passes through the two or more pre-selected locations in the sequential order;
        receiving a fourth selection of one or more time windows during which the alert should be triggered; and
        receiving a fifth selection of one or more alert mechanisms, including a method for transmitting the alert from the first device to the one or more second devices during a specific time window and a preference order for selecting the method from among multiple methods, based on the specific time window in which the alert is transmitted;
    configuring a tracking system that includes the GPS device, a time keeping system, and a message sending system, wherein configuration of the tracking system includes:
        operating the time keeping system independently of the tracking system;
        enabling the tracking system when the time keeping system indicates that a current time is within one of the one or more time windows;
        disabling the tracking system when the time keeping system indicates that the current time is not within one of the one or more time windows;
        enabling the message sending system when the GPS device receives a signal from one or more satellites that the GPS device has passed the two or more pre-selected locations, in the pre-established sequential order, during one of the one or more time windows corresponding to the two or more preselected locations; and
        when the GPS device has not passed through the two or more pre-selected locations, in the pre-established order, during the pre-selected time window, or following a transmission of the alert, disabling the message sending system;
    detecting, via the GPS device when the GPS device passes through two or more pre-selected locations in a pre-established sequential order during a pre-selected time window, wherein the locations are pre-selected in the pre-established sequential order to identify initiation of a movement towards the destination;
    retrieving an identification of at least one second device to which the alert is to be sent when the GPS device passes through the pre-selected locations during the pre-selected time window;
    dynamically selecting the alert mechanism and the method for transmitting the alert from the first device to the one or more second devices, based on the pre-selected time window and the preference order; and
    automatically sending the alert to the one or more second devices when the GPS device passes through at least two pre-selected locations, in the pre-established order, during the pre-selected time window, wherein the alert informs a user of the one or more second devices that a next user corresponding to the GPS device has commenced a journey to the destination;
    wherein said dynamically selecting and said automatically sending includes tailoring an alert type based on a selected second device to which the alert is being transmitted, wherein:
        when a phone number is the device ID for the second device, automatically selecting and sending one or more of a voice message alert and text message alert during the pre-selected time window;
        when an electronic mail (e-mail) address is the device ID of the second device, automatically selecting and sending one or more of an email notification and a text message alert to the e-mail address during the pre-selected time window.

* * * * *